United States Patent
Julius et al.

[11] Patent Number: 5,426,983
[45] Date of Patent: Jun. 27, 1995

[54] FLOW METER

[75] Inventors: Edmund Julius; Hartmut Haubrich, both of Aachen, Germany

[73] Assignee: AMEPA Engineering GmbH, Aachen, Germany

[21] Appl. No.: 237,784

[22] Filed: May 4, 1994

[30] Foreign Application Priority Data

May 15, 1993 [DE] Germany .......... 43 16 344.0

[51] Int. Cl.⁶ .................................. G01F 1/56
[52] U.S. Cl. ...................... 73/861.08; 73/861.11
[58] Field of Search ........... 73/861.11, 861.08, 861.12

[56] References Cited

U.S. PATENT DOCUMENTS

| | | | |
|---|---|---|---|
| 3,138,022 | 6/1964 | Mayer | 73/861.11 |
| 3,191,436 | 6/1965 | Davis | 73/861.11 |
| 3,802,262 | 4/1974 | Banks | 73/861.11 |
| 4,363,244 | 12/1982 | Rabeh et al. | 73/861.08 |

FOREIGN PATENT DOCUMENTS 0964454 10/1982 U.S.S.R. .......... 73/861.11

*Primary Examiner*—Richard E. Chilcot, Jr.
*Assistant Examiner*—Elizabeth L. Dougherty
*Attorney, Agent, or Firm*—Mark T. Basseches

[57] ABSTRACT

A contact free flow meter for determining the velocities and/or flow directions of electrically-conductive fluids is disclosed. At least one primary magnetic field is arrayed generally perpendicular to the flow path, the field having strength gradients extending along the flow path. At least two magnetic field sensors are spaced apart in the direction of the flow path the sensor being responsive to the magnetic field. The device is capable of functioning notwithstanding electrically-conductive material such as pipe walls interposed between the fluid and the meter.

7 Claims, 1 Drawing Sheet

FLOW METER

The present invention relates to a flow meter for contact-free determination of velocities of electrically conductive fluid media. The device makes use of the interaction between at least one primary magnetic field and non-homogeneous or non-stationary flow fractions. The fluid is passed through at least two magnetic field measuring devices, so that the flow velocity and/or direction can be determined thereby.

PRIOR ART

Aside from generally known devices for measurement of local flow velocities which rely on measurement probes inserted into the flowing media, an inductive probe flow measurement system is known from DE 33 47 190 A1 that facilitates contact-free determination of the velocities of electrically-conductive fluid media. A transformer coupling of three cylindrical induction coils is altered by the flowing medium, and a signal dependent on flow velocity is obtained thereby.

Although in the known inductive-probe flow-measurement system, the transformer coupling of the coils is amplified by ferromagnetic coil cores and thus facilitates measurements through thicker cladding tubes, this system suffers from a significant disadvantage. This consists in the fact that the transformer coupling is influenced not only by the flow velocity of the medium, but also, for example, by the current conductivity and temperature of the surroundings, necessarily resulting in measurement errors.

A further arrangement is known from DE 33 26 476 A1 that, among other things, serves to determine the quantity of motion of an object that can alter an alternating magnetic field by its action. Different localized magnetic field sensors are arranged in the area of influence of the alternating magnetic field. The magnetic field sensor output signals allow recognition of the impact on the alternating magnetic field caused by the object to be measured.

The fact that the signals output by the magnetic field sensors are independent of the velocity of the object to be measured is touted as a significant advantage of this known arrangement. The device, however, suffers from a major disadvantage, namely, with the exclusive use of alternating fields, no components, e.g. walls, of an electrically-conductive material may be placed between the measuring device, on the one hand, and the body to be measured, on the other, in order to be able to make a sufficiently precise measurement.

Finally, in printed document "EUR 6296 DE I" of the European Communities Commission, "Technical Research—Steel—Measurement and Analysis—Measurement of Flow of Liquid and Solid Metal", a measurement device is described (pp 22 and ff.) and shown as a diagram (pp. 55 and ff.), according to which a homogeneous alternating field is used to measure the velocity of liquid metal as the primary field. The alternating effect of the primary field, however, can be used with the flow only on a very contingent and spatially inaccurate basis.

SUMMARY OF THE INVENTION

The invention has for it primary object creating a flow meter of the magnetic field type in such manner that the velocities and/or directions of electrically-conductive fluid media can be determine precisely, despite the existence of walls, consisting of or containing electrically-conductive material interposed between the flow meter and the media.

To attain this object there is provided a contact-free flow measuring device for non-homogeneous or moving electrically conductive fluids, the device including means for conducting the fluid along a predetermined path, at least one primary magnetic field forming device for generating a field perpendicular to the path, the field having a gradient in the flow direction, and at least two magnetic field measuring components encompassed within the field and separated in the direction of movement of the flow of fluid for measuring the field in a direction perpendicular to the flow direction.

This electrically-conductive component, can, without losses, penetrate the primary field, formed as a direct current field, pursuant to the invention. By adjustment of the field produced, the devices which measure the magnetic fields can lie at the point of maximum interaction between the primary field and the non-homogeneous or non-stationary flow fraction and thus in the range of maximum magnetic field alteration. The simultaneous use of several components measuring magnetic fields makes it possible to effectively eliminate from the evaluation signal fractions not caused by motion, e.g. by correlation. The flow meter pursuant to the invention thus permits not only measurement of motion velocity and direction of the medium through walls of electrically-conductive components but also permits the placement of the meter at a greater distance from the flowing medium, without impairing the precision of the measurement results. The simultaneous use of several components measuring magnetic fields also permits determination of flow direction.

According to the methods of embodiment of the invention, the components producing magnetic fields may consist of coils or permanent magnets, and may be arranged on a side, facing the electrically-conductive fluid medium, of a carrier made of magnetically-conductive material. The carrier of magnetically-conductive material may, for example, be a yoke that defines spatial areas in which the primary field runs.

According to a further method of embodiment of the invention, several component producing and measuring magnetic fields form components combinations that are arranged in such manner that simultaneous measurement of the velocity components is possible in different spatial directions.

Finally, a method of embodiment of the invention provides that, with one or more of the components measuring magnetic fields, one or more electronic reader and/or plotter and/or amplifier units are placed in a common housing.

It may also be advantageous to apply the components measuring and producing magnetic fields in or on a wall or at a distance therefrom whereby the wall may be a component of a container or a conduit.

Naturally, insulating and/or cooling the components producing and measuring magnetic fields and/or the electronic reader or plotter unit as necessary from the effects of heat also falls within the framework of the invention.

BRIEF DESCRIPTION OF DRAWINGS

A flow meter pursuant to the invention is shown in the drawings. They show.

DETAILED DESCRIPTION OF DRAWINGS

Figure 1:
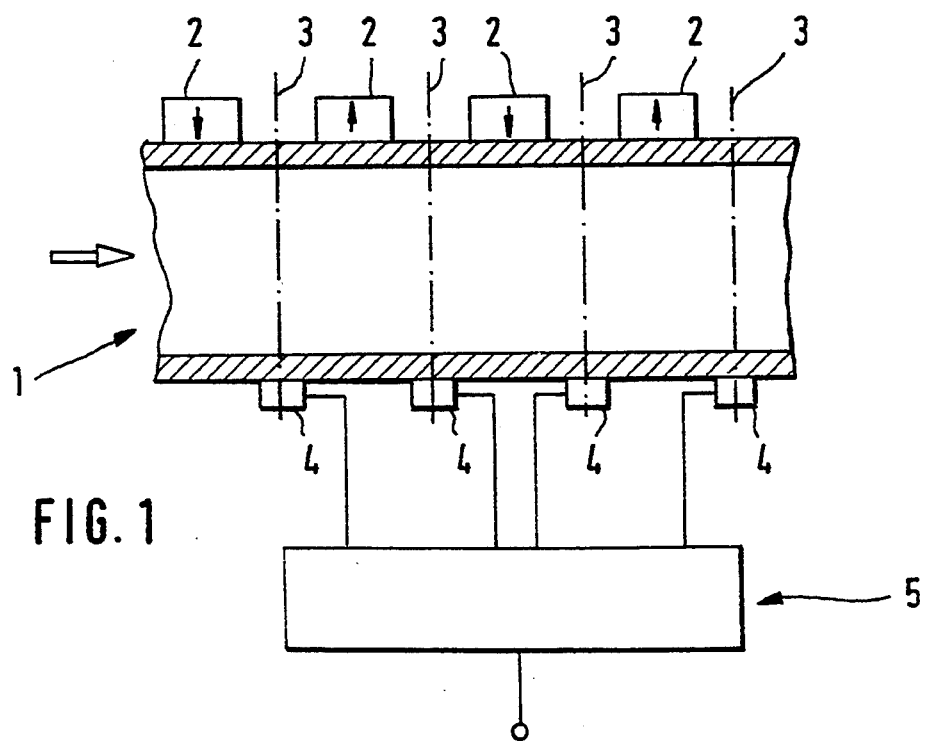
FIG. 1 a schematic representation of the meter arranged on an extended conduit, and FIG. 2 a schematic representation of the meter arranged on a conduit divider.

The portion of conduit 1, shown in part, serves to allow the flow of an electrically-conductive fluid medium, the velocity of which is to be measured.

The medium flows through a magnetic field produced by components 2, e.g. permanent or electromagnets, arranged on the exterior of conduit 1, the components being spaced along the conduits to provide gradients. Dotted line 3, that runs perpendicular to the longitudinal axis of conduit 1 between adjacent magnetic field producing components 2 indicates the planes where the gradients reach their maxima. In these planes, components 4, comprising field strength measuring devices, are arranged on the exterior of conduit 1, facing the side of conduit 1 having the field producing devices 2. Signals from components 4 are forwarded to plotter unit 5 for example.

The interaction of a non-homogeneity in the flowing medium with the magnetic field produced occurs successively in all components 4 measuring magnetic fields, so that the velocity can be determined directly from their distance from each other and the time interval between successive signals.

Figure 2:
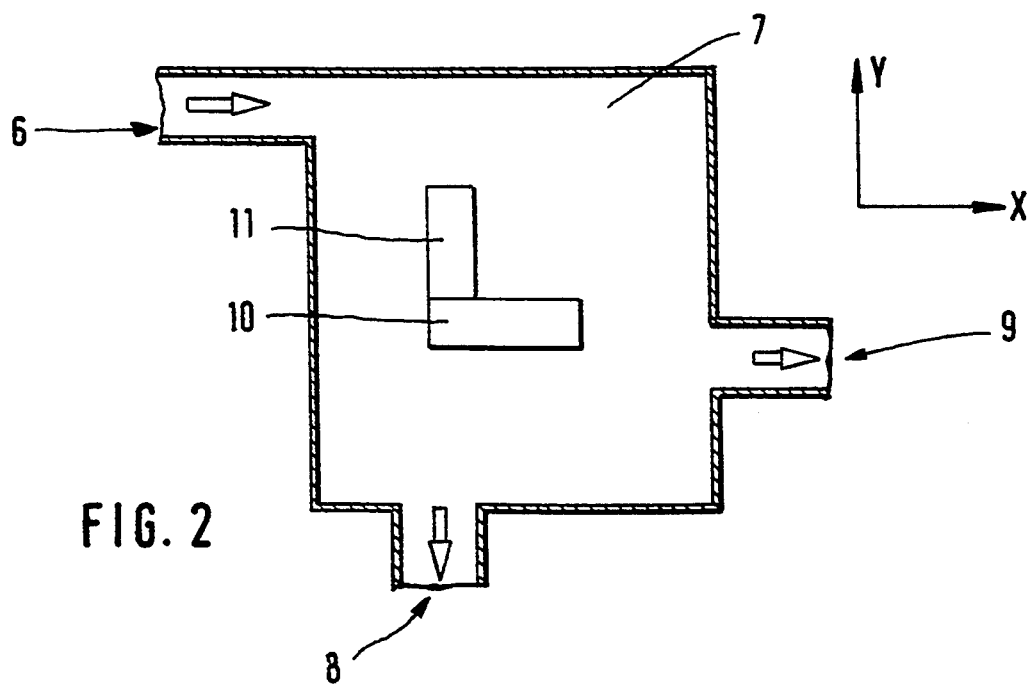

The arrangement pursuant to FIG. 2 facilitates measurement of velocity components in various spatial directions. If, pursuant to this method of embodiment, a medium flows over supply conduit 6 of conduit divider 7 and out through attached outlet conduits 8 and 9, set at right angles to each other, the velocity components X in conduit divider 7 can be determined by component combination 10 and velocity component Y can be determined by additional component combination 11, each of which includes field producing and plural field sensing devices 2 and 4. Component combinations 10 and 11 are arranged in such manner that several components act simultaneously to determine both the velocity for the X direction and the velocity for the Y direction.

From the foregoing, it will appreciated that there is provided, in accordance with the invention, a fluid flow measuring device for conductive fluids which will function without contacting the fluid and which will operate notwithstanding conductive components such as tube walls or the like intervening between the fluid and the measuring device.

Having thus described the invention and illustrated its use, what is claimed as new and is desired to be secured by Letters Patent is:

1. A flow meter for contact-free measurement of flow velocity of electrically conductive fluid media using the interaction between at least one magnetic field and non-homogeneous or non-stationary patterns of fluid flow comprising a conduit defining a fluid flow path, means for generating a magnetic field in said flow path, said field extending substantially perpendicular to said path, said field including at least one gradient in said flow path of said fluid and at least two magnetic field measuring means mutually spaced apart along said flow path downstream of said field for measuring said gradient field in a direction generally perpendicular to said flow path.

2. A flow meter in accordance with claim 1 wherein said magnetic field producing means comprise a permanent magnet or a coil.

3. A flow meter in accordance with claim 1 wherein said conduit comprises magnetically conductive material.

4. A flow meter in accordance with claim 1 wherein said means for generating a magnetic field comprise a series of magnets on a side of said conduit, said magnets being mutually spaced along said flow path.

5. A flow meter in accordance with claim 4 and including two or more magnetic field measuring means positioned to sense the field gradient of each of said series of the magnets which comprise magnets.

6. A flow meter in accordance with claim 5 and comprising readout means including a plotter for displaying the output of said field measuring means.

7. A flow meter assembly for measuring flow velocity and flow direction of an electrically conductive fluid media within an enclosure using the interaction between a magnetic field and non-homogeneous or non-stationary patterns of fluid flow, comprising a conduit divider within said enclosure, first and second angularly offset flow meters within said enclosure, each said flow meter comprising a conduit defining a fluid flow path, means for generating a magnetic field in said flow path, said field extending substantially perpendicular to said path and including at least one gradient along the flow path of said fluid within said conduit, and at least two magnetic field measuring means spaced apart along said flow path downstream of said field generating means for measuring said field in a direction generally perpendicular to said flow path.

* * * * *